United States Patent
Rozema

[19]

[11] Patent Number: 6,151,755
[45] Date of Patent: Nov. 28, 2000

[54] FRONT-MOUNTED HINGE

[75] Inventor: Timothy S. Rozema, Irvine, Calif.

[73] Assignee: Hartwell Corporation, Placentia, Calif.

[21] Appl. No.: 09/243,049

[22] Filed: Feb. 3, 1999

[51] Int. Cl.[7] .................................. E05D 7/10; E05F 1/14
[52] U.S. Cl. ................................ 16/361; 16/357; 16/366; 16/382
[58] Field of Search ............................ 16/361, 357, 358, 16/359, 366, 382; 49/400; 312/326, 328, 329; 403/52, 53, 54

[56] References Cited

U.S. PATENT DOCUMENTS

| | | |
|---|---|---|
| 1,094,010 | 4/1914 | Parsons ...................................... 16/361 |
| 3,651,539 | 3/1972 | Breunich et al. ......................... 16/141 |
| 4,683,614 | 8/1987 | Anderson . |
| 4,807,331 | 2/1989 | Calucci ..................................... 16/262 |
| 5,075,928 | 12/1991 | Bobrowski ................................ 16/273 |
| 5,195,796 | 3/1993 | Wampler, II . |
| 5,419,012 | 5/1995 | Lewis . |
| 5,499,428 | 3/1996 | Okada . |
| 5,584,099 | 12/1996 | Westerdale . |
| 5,749,125 | 5/1998 | Davis et al. .............................. 16/382 |
| 5,867,869 | 2/1999 | Garrett et al. ............................ 16/252 |
| 6,080,294 | 6/2000 | Perkins et al. ............................ 16/252 |

OTHER PUBLICATIONS

Engineering drawings, Hartwell Corp., Hinge Assembly—Double Acting, H3170 (2 sheets).
Engineering drawings, Hartwell Corp., Hinge Assembly—Hi–Pressure, H–6300 (2 sheets).

*Primary Examiner*—Anthony Knight
*Assistant Examiner*—Vishal Patel
*Attorney, Agent, or Firm*—Pretty & Schroeder, P.C.

[57] ABSTRACT

Disclosed is a front-mounted hinge for mounting a door to a vehicle structure. The hinge includes a housing, a translating base, a hinge strap, and a cover assembly. The housing mounts to the exterior surface of the vehicle structure, and the hinge strap mounts to the exterior face of the door. The translating base is slidably mounted to the interior surface of the housing. The translating base moves relative to the housing between an abutting position, in which the translating base abuts a mounting plate of the housing, and an elevated position, in which the translating base is moved away from the mounting plate. The hinge strap is pivotally connected to the translating base so that when the hinge strap is pivoted, the translating base is caused to move between the abutting and elevated positions and the door moves between closed and open positions.

12 Claims, 9 Drawing Sheets

FRONT-MOUNTED HINGE

BACKGROUND OF THE INVENTION

1. Field of the Invention

The present invention relates to the mechanical arts. In particular, this invention relates to a hinge for mounting a door to a structure for movement of the door between open and closed positions with respect to an access opening of the structure.

2. Discussion of the Related Art

Doors for use with vehicles, such as ships or aircraft, are often mounted to the associated vehicle structure by gooseneck hinges. Gooseneck hinges allow for movement of the door between closed and open positions with respect to an access opening in the vehicle. Examples of access openings include those in ships, aircraft, and other vehicles from which individuals enter and exit and that provide access to items in the vehicles.

Gooseneck hinges conventionally include a curved gooseneck member having one end pivotally mounted to the interior surface of the vehicle structure and an opposing end fixedly secured to the interior face of the door. The gooseneck member extends between the vehicle structure and the door such that the door is capable of moving away from the vehicle structure in a spaced relationship upon movement from the closed position to the open position.

Conventional gooseneck hinges have been modified by slidably mounting the gooseneck member to the associated vehicle structure, such as by mounting the gooseneck member in a straight or curved slot. A disadvantage of such gooseneck hinges is that regardless of the manner in which the gooseneck hinge is mounted to the vehicle structure, either pivotally or slidably, the curved shape of the gooseneck member requires a large amount of space behind the interior face of the door. The gooseneck member intrudes into the interior of the structure thereby limiting the vehicle's usable space. Unfortunately, this results in less room for individuals to move in and out of the access opening or less room for storing items within the structure. In certain naval and aircraft applications, where the conservation of space is essential, gooseneck hinges are especially undesirable. To maximize the usable space within the structure, it is desirable to minimize the space occupied by the hinge.

Often a seal is mounted between the vehicle structure and the door so that when the door closes the seal compresses and an air-tight and/or water-proof enclosure is created. Proper sealing requires that the seal compress evenly. A disadvantage of conventional hinges is that they unevenly compress the seal between the door and the vehicle structure when the door is closed. This occurs because as the conventional hinge rotates the door into the closed position, the door first compresses the seal at the hinge line and the rest of the seal compresses as the door continues to rotate into the closed position, which results in an uneven and often inadequate seal.

For example, seals utilized with aircraft need to be compressed evenly so that the associated aircraft structure can be properly pressurized during flight. Unfortunately, seals unevenly compressed by gooseneck hinges may result in the aircraft structure being inadequately pressurized. On the other hand, seals utilized with ships need to compressed properly to prevent water from entering the structure. This is especially important due to the corrosive effect of salt water which could potentially damage equipment stored within the ship. Disadvantageously, seals unevenly compressed by a gooseneck hinge may allow salt water into the structure of the ship and the equipment stored therein could be severely damaged.

In view of the above, it should be appreciated that there is a need for a hinge that does not intrude into the interior of the vehicle structure and that allows the door to evenly compress a seal upon closing. The present invention satisfies these and other needs and provides further related advantages.

SUMMARY OF THE INVENTION

The present invention resides in a front-mounted hinge which is mounted to the exterior face of the door and the exterior surface of the vehicle structure. The front-mounted hinge provides advantages over known hinges in that it does not intrude into the interior of the vehicle structure and it allows the door to evenly compress a seal upon closing.

The hinge of the present invention mounts a door to a vehicle structure for rotation of the door between open and closed positions with respect to an access opening in the structure. The hinge includes a housing having interior and exterior surfaces, a translating base, and a hinge strap. The housing has a mounting plate for mounting the hinge to the exterior surface of the vehicle structure, and the hinge strap mounts to the exterior face of the door. Because the hinge is mounted to the exterior surface of the structure and the exterior face of the door, the hinge does not intrude into the interior of the structure.

The translating base is slidably mounted to the interior surface of the housing. The translating base is movable between an abutting position, in which the translating base abuts the mounting plate of the housing, and an elevated position, in which the translating base is moved away from the mounting plate of the housing. In some embodiments, the translating base has a slot, and the housing has a pair of guide slots. A base rivet extends through the housing and the slot slidably mounting the translating base to the interior surface of the housing. Also, a guide pin extends from each side of the translating base through each guide slot in the housing, respectively.

The hinge strap is pivotally connected to the translating base so that when the hinge strap is pivoted the translating base is caused to move between the abutting and elevated positions and the door moves between closed and open positions. In some embodiments, a strap rivet extends through the translating base and the hinge strap, such that the strap rivet pivotally connects the hinge strap to the translating base, and defines a pivot axis about which the hinge strap and the door rotate. As the door is closed, the translating base moves from the elevated position to the abutting position. The slot of the translating base moves along the base rivet and each guide pin moves along each guide slot, respectively. This movement of the translating base guides the hinge strap and the door perpendicularly inwards with respect to the exterior surface of the vehicle structure such that the door compresses the seal evenly. An advantage of the door compressing the seal evenly is that a very strong seal is created between the door and the surrounding structure, overcoming the problems of inadequate sealing due to uneven seal compression.

Also, in some embodiments, the hinge includes a cover assembly formed of a cover, a shield, a shield rivet, and a spring. The cover is mounted within the open top end of the housing so that it covers the interior of the housing and is permanently connected to the shield. The cover and shield are rotatably mounted to the translating base by the shield rivet which extends through the translating base, the shield, and the spring. The spring biases the cover flush relative to the housing. When the door is closed, the cover is flush with the housing and provides a flush surface relative to the rest of the hinge. When the door rotates to angles greater than 90 degrees relative to the hinge, the cover assembly pivots into the housing allowing the door to continue to rotate to extreme open angles. On the other hand, when the door rotates back to the closed position, the spring biases the cover back to its flush position relative to the housing.

Other features and advantages of the present invention will become apparent from the following description of the preferred embodiments, taken in conjunction with the accompanying drawings, which illustrate, by way of example, the principles of the invention.

DESCRIPTION OF THE PREFERRED EMBODIMENTS

The front-mounted hinge of the present invention mounts a door to a vehicle structure for movement of the door between open and closed positions with respect to an access opening in the structure. For example, the door can be opened and closed to allow individuals to move in and out of the structure or to provide access to items stored within the structure. As shown in the exemplary drawings, and with particular reference to FIG. 1, the present invention is embodied in a front-mounted hinge 20 for mounting a door 22 to a door frame 24 and evenly compressing a seal 32. The front-mounted hinge includes a housing 40, a translating base 42, a hinge strap 44, and a cover assembly 46.

Figure 2:
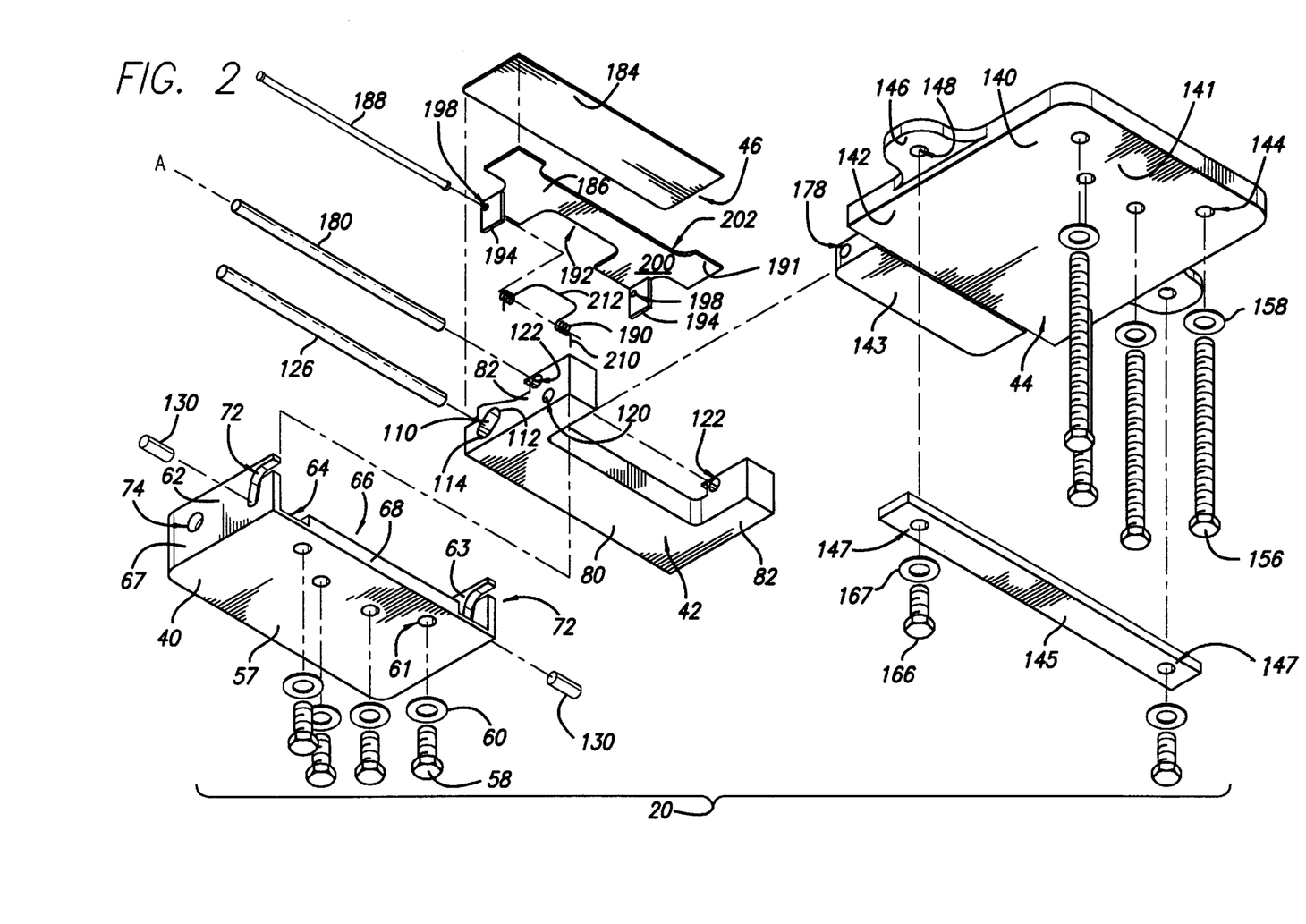
FIG. 2 is an exploded view of the front-mounted hinge shown in FIG. 1.

The housing 40 is mounted flushly to an exterior surface 50 of the door frame 24. The housing fits within a recess 52 of the door frame such that the housing is located adjacent to the exterior face 56 of the door 22. With reference to FIG. 2, the housing 40 includes a mounting plate 57 and extending perpendicularly from the mounting plate a pair of opposing side walls 62 and 63 define an interior surface 64 with an open top end 66 and an exterior surface 67. The mounting plate is mounted to the exterior surface of the door frame by four hex bolts 58 which extend through the door frame and are accepted by mounting holes 61, respectively. Washers 60 are utilized with the hex bolts.

The side walls 62 and 63 are spaced apart by the mounting plate 57 and are parallel to each other. Each side wall has formed therethrough an aligned, angled guide slot 72, and an aligned hole 74. With reference again to FIG. 1, the mounting plate includes a flange 68 forming a channel 70 for positioning the translating base 42.

Figure 3:
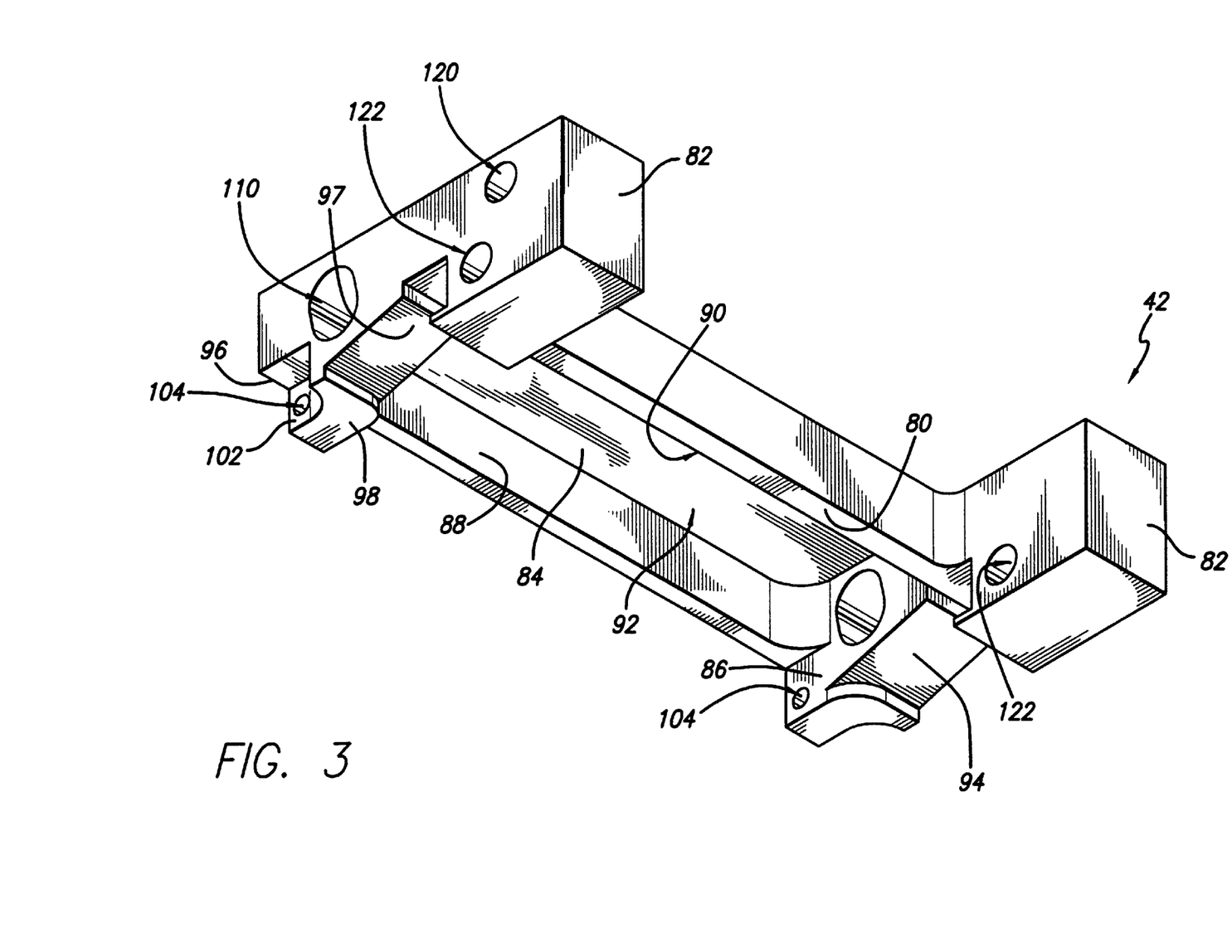
FIG. 3 is a perspective view of the translating base shown in FIG. 2.

FIG. 3 shows the details of the translating base 42. The base is U-shaped having a central member 80 and a pair of legs 82. The central member has an interior bottom surface 84, two interior side surfaces 86 (one shown), an interior back surface 88, and an interior front surface 90, defining a recess 92. Each leg has a top 94 and a back 96. A portion 97 of each top is angled and the top of each leg also includes an L-shaped mounting structure 98, adjacent the back, for mounting a cover assembly. Each mounting structure has a back portion 102 which is recessed relative to the rest of the leg and includes a shield rivet mounting hole 104 formed therethrough.

Referring additionally to FIG. 2, each leg 82 has an aligned angled slot 110 formed therethrough having a first end 112 and a second end 114. Each leg also has a pin mounting hole 120 (only one shown) which extends partially into the leg for receiving a guide pin 130 and an aligned strap rivet mounting hole 122 extending through each leg for receiving a strap rivet 180.

Figure 1:
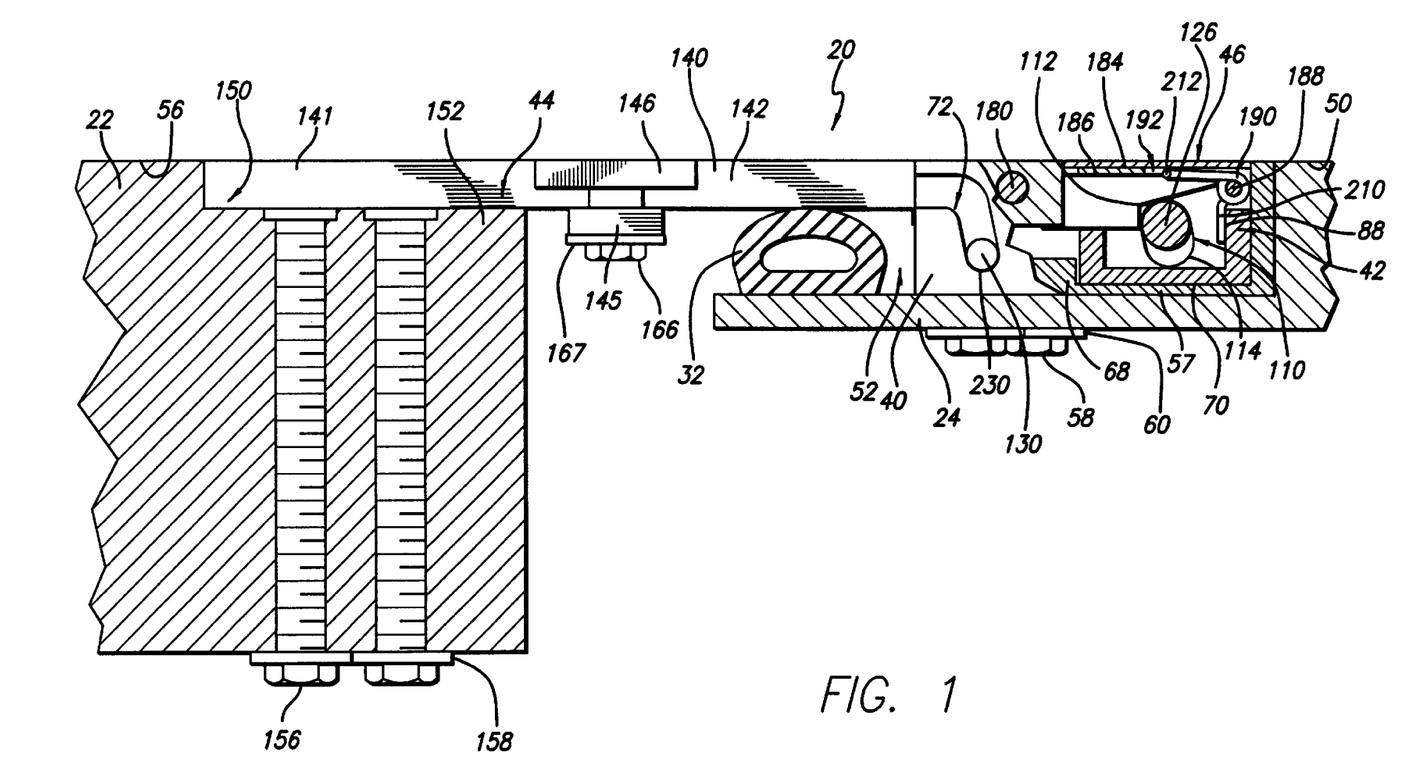
FIG. 1 is a side view of a front-mounted hinge according to the invention mounting a door to a door frame, with the door in the closed position, including a cut-away view showing a translating base in cross-section in the abutting position.

The translating base 42 is slidably mounted to the housing 40 for movement between abutting and elevated positions. A base rivet 126 extends through the aligned holes 74 in the side walls 62 and 63 of the housing and through the angled slots 110 in the legs 82 of the translating base locating the translating base in the housing. Each guide pin 130 is received in each pin mounting hole 120 in each translating base leg and extends from each translating base leg through each angled guide slot 72 of the housing. As shown in FIG. 1, in the abutting position, the translating base abuts against the surface of the channel 70 of the mounting plate 57 and the base rivet abuts against the first ends 112 of the angled slots.

Continuing with reference to FIG. 2, the hinge strap 44 includes a planar mounting portion 140 having a mounting section 141, an intermediate section 142, and a narrower connector section 143. The mounting section has four mounting holes 144 used for mounting the hinge strap to the door.

A backplate 145 having a mounting hole 147 at each of its ends is secured to ears 146 that extend transversely from the intermediate section 142. Each ear has an ear mounting hole 148 that aligns with the respective mounting hole of the backplate. The connector section 143 has a mounting hole 178 formed therethrough. A strap rivet 180 extends through the strap rivet mounting holes 122 of the legs 82 of the translating base 42 locating the connector portion between the legs. The strap rivet pivotally connects the hinge strap to the translating base. The strap rivet defines a pivot axis (A) about which the hinge strap and the door rotate between open and closed positions.

As best seen in FIG. 1, the mounting portion 140 of the hinge strap 44 fits within a recess 150 of the exterior face 56 of the door 22 such that the hinge strap mounts flushly to the door. A thick portion 152 of the door is mounted to the first section 141 of the hinge strap by the four hex bolts 156 (two shown) which extend through the thick portion of the door and are accepted by the mounting holes 144 (as shown in FIG. 2), respectively. Also, washers 158 are utilized with the hex bolts.

Figure 4:
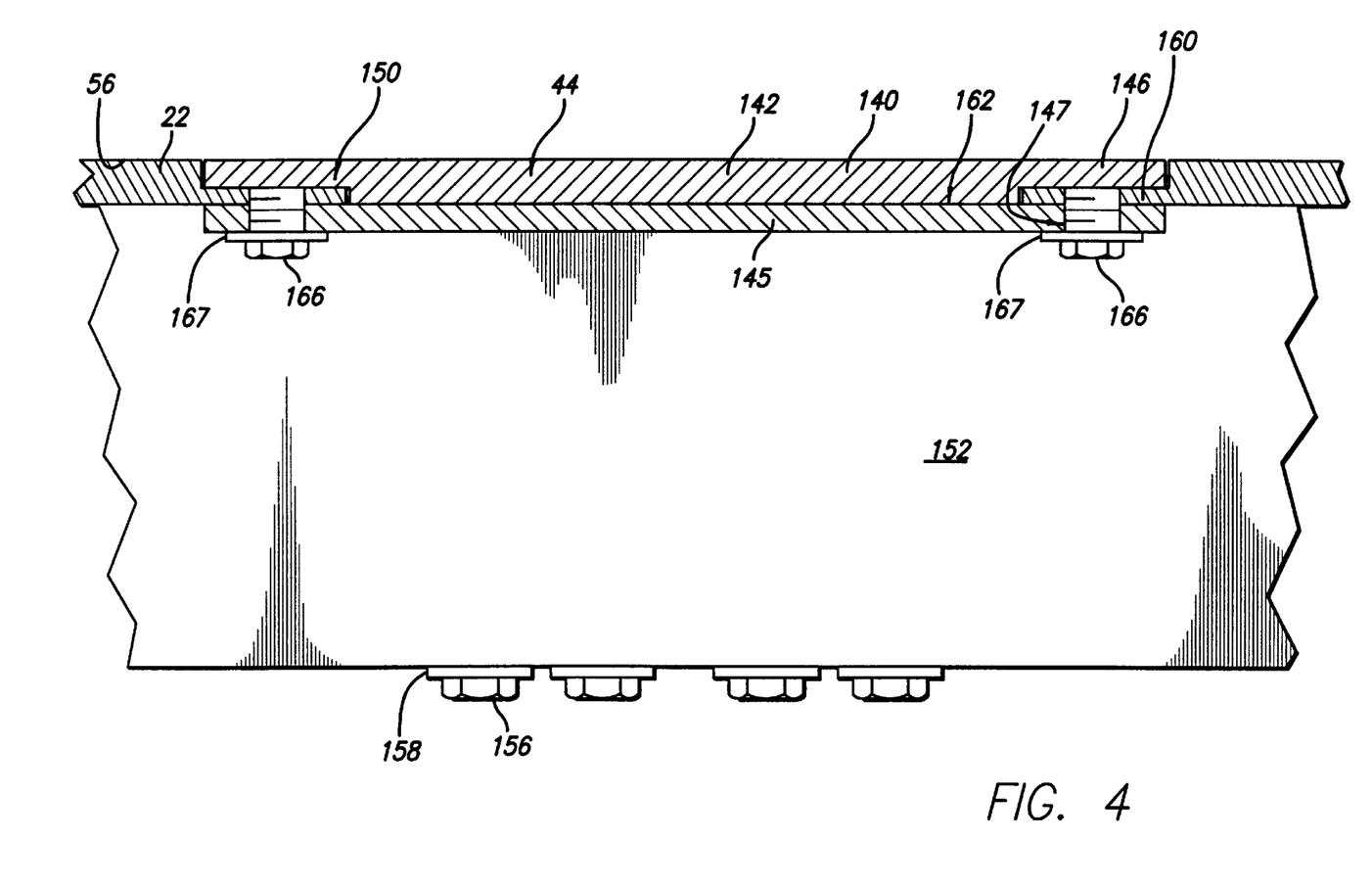
FIG. 4 is a sectional view of the front-mounted hinge shown in FIG. 1 illustrating a hinge strap mounted to a narrow portion of the door.

With reference to FIG. 4, a thinner portion 160 of the door 22 (shown in cross-section) has a cut-out section 162 for receiving the intermediate section 142 of the mounting portion 140 and the backplate 145. The thinner portion of the door is secured to the intermediate section by the hex bolts 166. The hex bolts extend through the mounting holes 147 of the backplate, through the thinner portion of the door, and are accepted by the ear mounting holes 148 (as shown in FIG. 2) of the ears 146. Also, washers 167 are utilized with the hex bolts. The backplate provides extra strength for the hinge at these hinge connection points.

Figure 5:
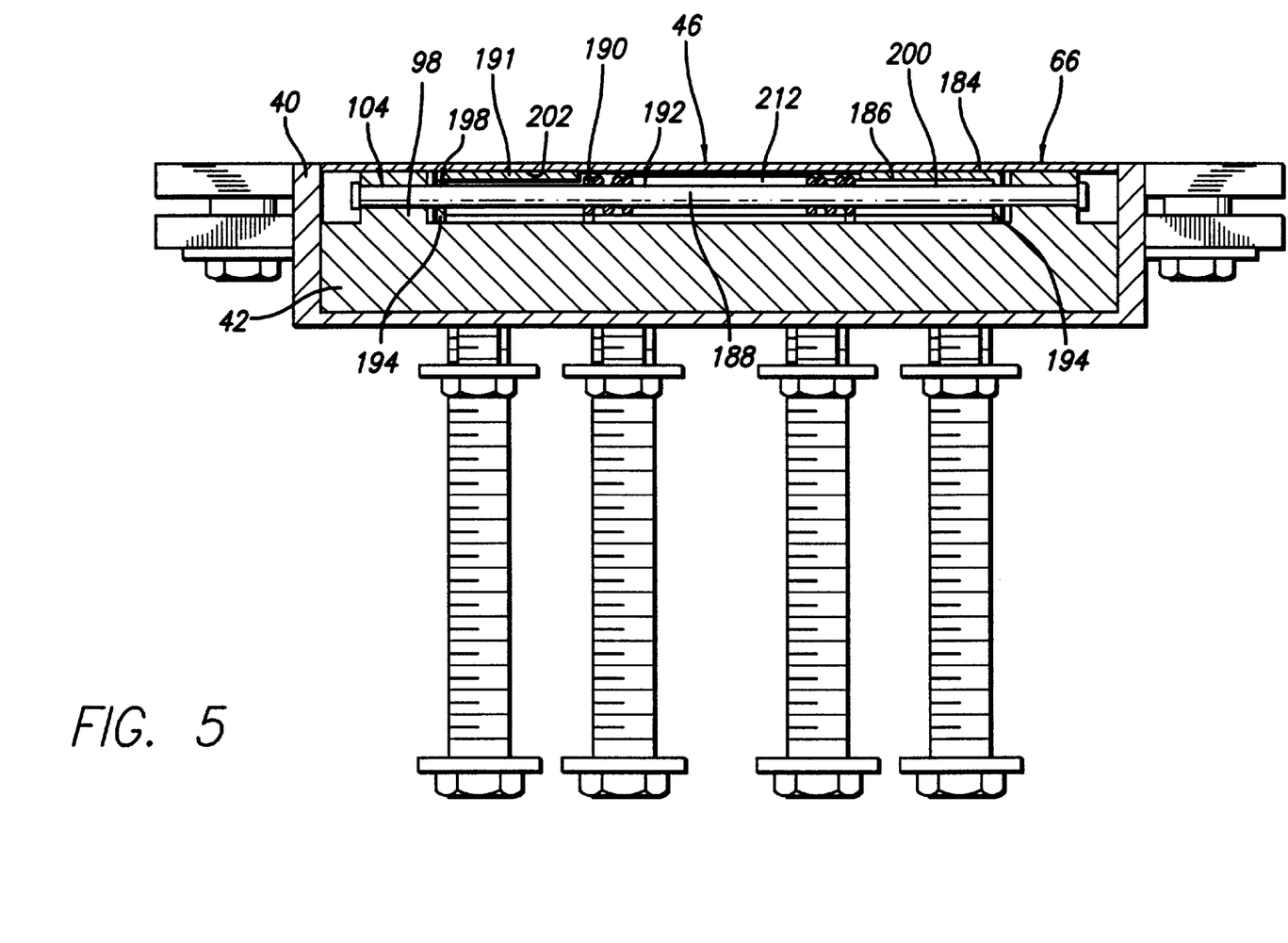
FIG. 5 is sectional view of the front-mounted hinge shown in FIG. 1 illustraling a shield rivet mounting a cover assembly to the translating base.

The cover assembly 46 is illustrated in FIGS. 2 and 5. The cover assembly is mounted within the housing 40 and covers the open top end 66 of the housing. The cover assembly includes a cover 184, a shield 186, a shield rivet 188, and a spring 190. The cover is rectangularly shaped and is sized to fit flushly within the open top end of the housing. The shield has a top wall 191 having a channel shaped opening 192 and two depending flanges 194 each having a mounting hole 198. The top wall has a bottom surface 200 and a top surface 202. The cover is permanently connected, preferably by spot-welding, to the top surface of the shield.

The cover 184 is rotatably mounted to the translating base 42 by the shield rivet 188. The shield rivet extends through the shield rivet mounting holes 104 of the mounting structures 98, through the mounting holes 198 of the shield 186, and through the spring 190. The shield rivet locates the shield within the housing 40 and rotatably mounts the shield and the cover to the translating base. The spring has a pair of first legs 210 and a U-shaped second leg 212. With reference to FIG. 1, the first legs (one shown) bear against the interior back surface 88 of the translating base and the second leg fits within the channel shaped opening 192 of the shield such that it bears against the cover. The spring biases the cover to a flush position relative to the housing. The front face of the cover is contoured to provide a flush surface relative to the rest of the hinge.

The method of use and operation of the front-mounted hinge 20, constructed as described above, proceeds as follows.

With reference to FIG. 1, when the door 22 is closed and the seal 32 is compressed, the guide pins 130 are located at first locations 230 of the angled guide slots 72, respectively, and the base rivet 126 is located at first ends 112 of the angled slots 110, respectively. The translating base 42 is in the abutting position in which the translating base abuts against the channel 70 of the mounting plate 57. The seal used may be a gasket, an O-ring, or any other sort of seal known in the art.

Figure 6A:
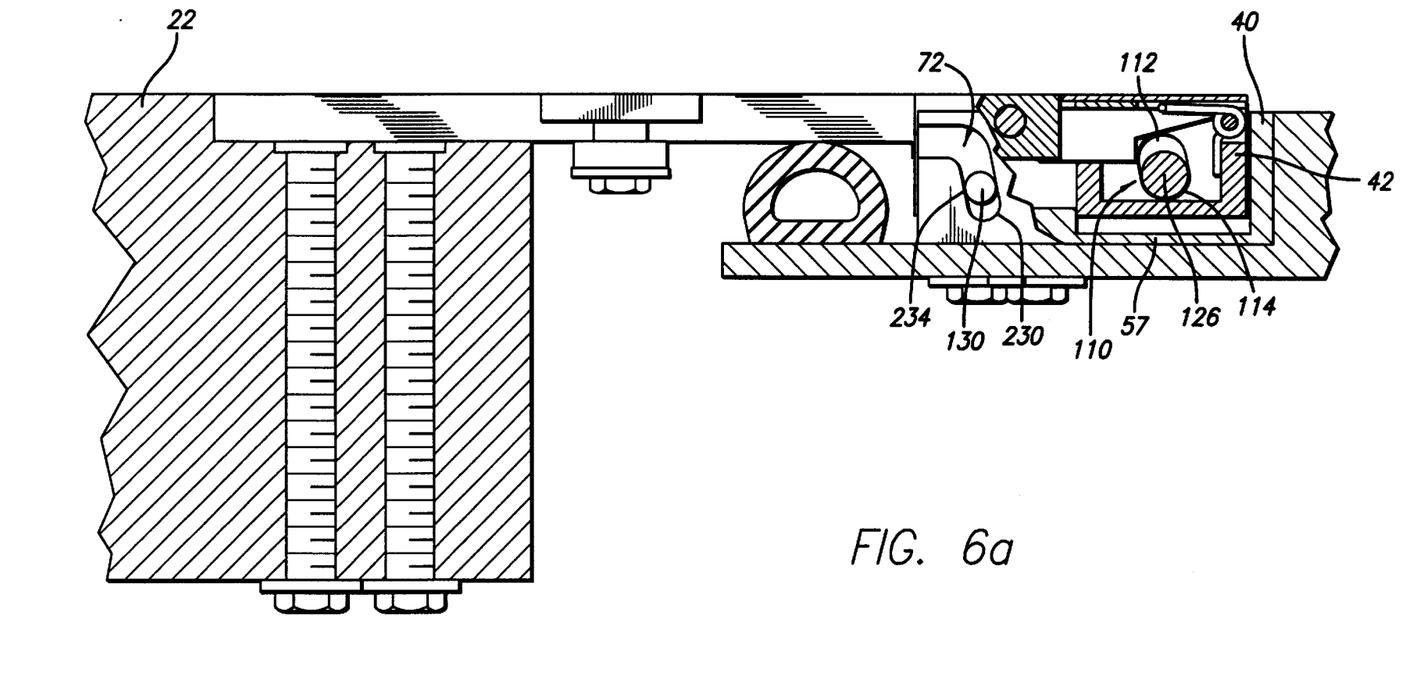
FIG. 6a is a side view of the front-mounted hinge with a cut-away view showing the translating base in cross-section moving from the abutting position of FIG. 1.

As the door 22 is opened, the translating base 42 moves relative to the housing 40. With reference to FIG. 6a, the translating base moves perpendicularly outwards relative to the mounting plate 57. The slots 110 move along the base rivet 126 from first ends 112 (FIG. 1) to second ends 114 (FIG. 6a), respectively, and the guide pins 130 move along the guide slots 72 from first locations 230 (FIG. 1) to intermediate locations 234 (FIG. 6a), respectively.

Figure 6B:
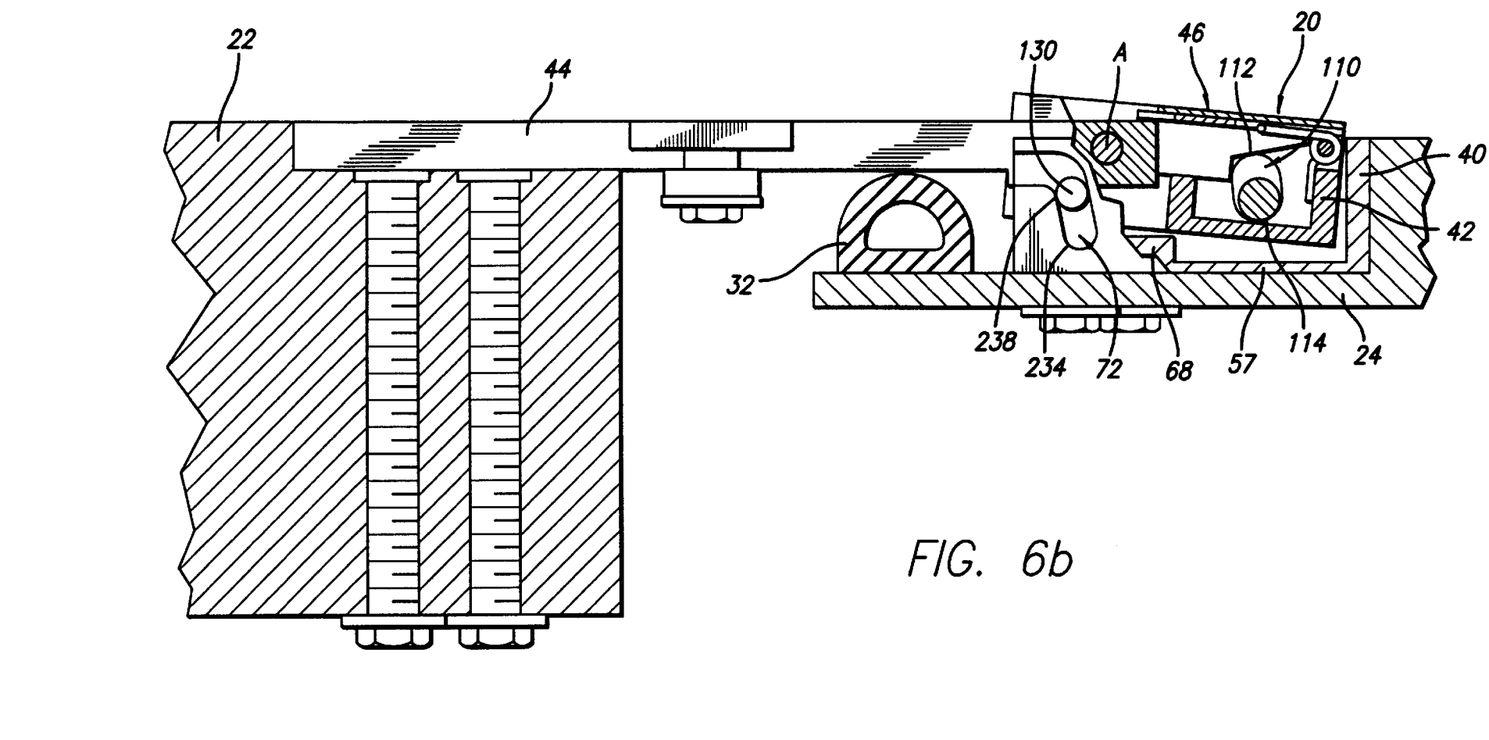
FIG. 6b is a side view of the front-mounted hinge with a cut-away view showing the translating base in cross-section moved from the position of FIG. 6a to an elevated position as the door has been moved perpendicularly outwards.

With reference to FIG. 6b, as the door 22 opens the translating base 42 continues to move relative to the housing 40. The guide pins 130 move along the guide slots 72 from intermediate locations 234 (FIG. 6a) to second locations 238 (FIG. 6b), respectively, and guide the translating base to the elevated position in which the translating base is angled relative to the mounting plate 57 and clears the flange 68. This movement of the translating base guides the door 22, and the pivot axis (A) for the door, perpendicularly outwards relative to the door frame 24. Preferably, the front-mounted hinge 20 allows the door to move at least 0.20 inches perpendicularly outwards relative to the door frame. An advantage of the hinge is that upon the initial opening of the door the translating base moves the pivot axis (A) outwards to allow greater rotation of the door.

Figure 6C:
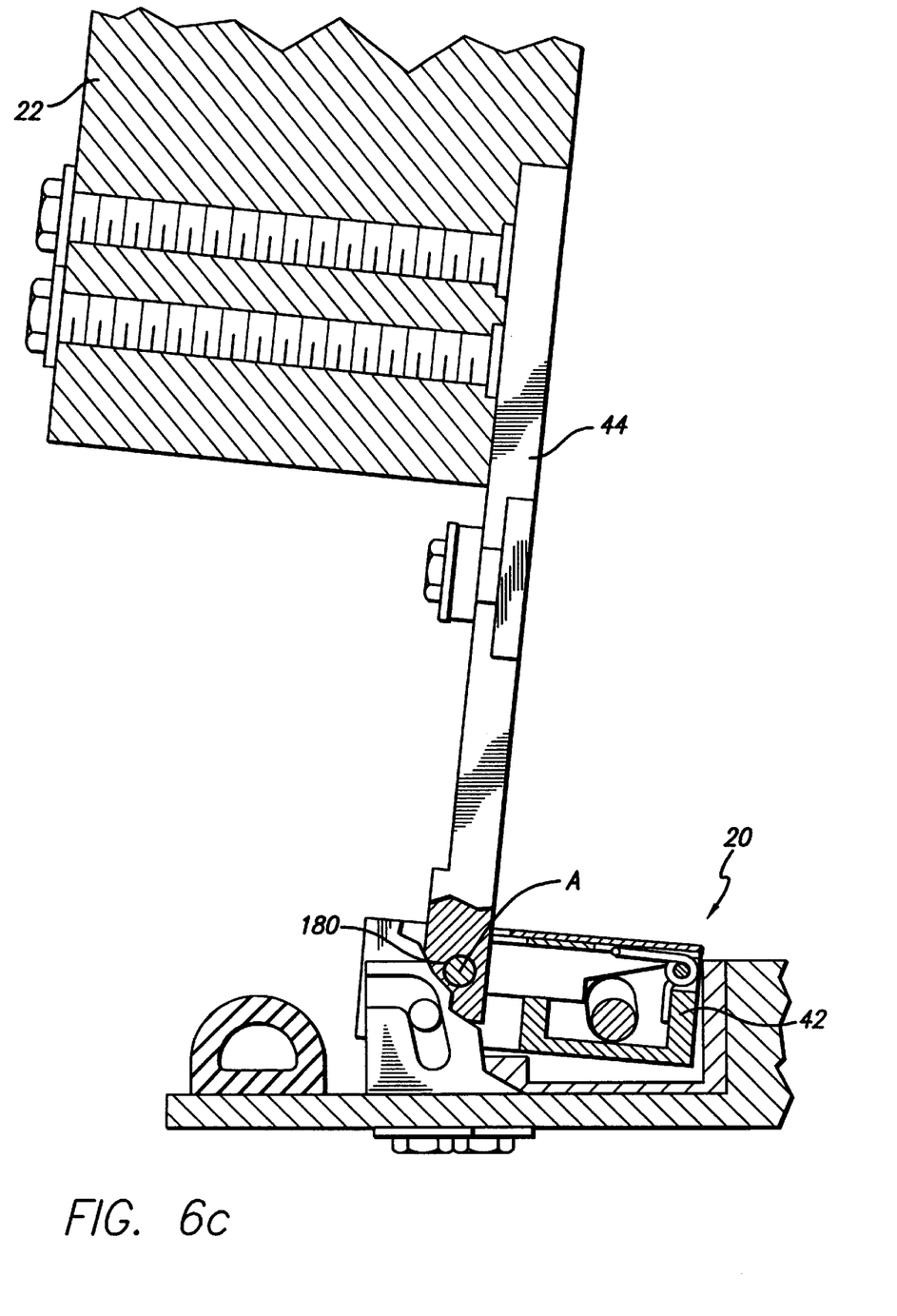
FIG. 6c is a side view of the front-mounted hinge illustrating the hinge strap rotated clockwise from the position of FIG. 6b to a position slightly greater than 90 degrees about a pivot axis shown in cross-section in a cut-away view.
Figure 6D:
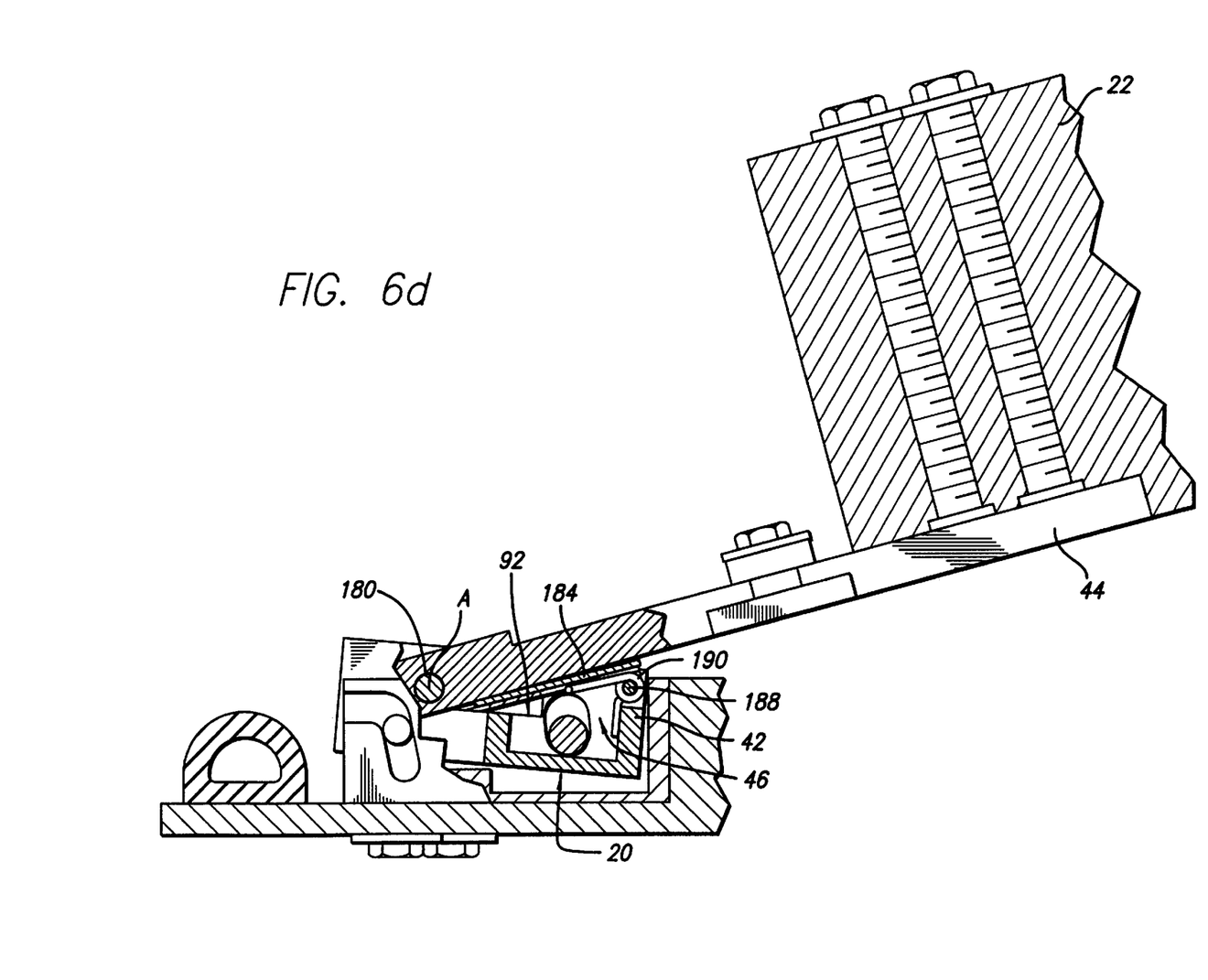
FIG. 6d is a side view of the front-mounted hinge illustrating the hinge strap rotated clockwise from the position of FIG. 6c to its maximum open position about the pivot axis with a cut-away view also showing the hinge strap forcing the cover assembly to rotate downwards into the housing.

With reference to FIGS. 6c and 6d, as the door 22 is opened the hinge strap 44 and the door rotate clockwise about the pivot axis (A). FIG. 6c shows the front-mounted hinge 20 when the door is rotated slightly greater than 90 degrees. Preferably, the hinge allows at least 165 degrees of rotation of the door. FIG. 6d shows the hinge when the door is rotated to its maximum open position in which the hinge strap abuts against the hinge and cannot rotate any farther. As the door rotates to angles greater than 90 degrees the hinge strap abuts against the cover 184 of the cover assembly 46 and forces the cover to rotate about shield rivet 188 into the housing 40. On the other hand, when the door is rotated back to the closed position, the spring 190 biases the cover back to its flush position relative to the rest of the hinge (FIG. 1).

The process by which the hinge allows the door to close is simply the reverse of the previously described process. As best seen in FIGS. 6c and 6d, as the door 22 is rotated towards the closed position, the door and the hinge strap 44 rotate counter-clockwise about the pivot axis (A). As the door is closed, the translating base 42 moves from the elevated position (FIG. 6b) back to the abutting position (FIG. 1). The guide pins 130 move along the guide slots 72 from second locations 238 (FIG. 6b) to first locations 230 (FIG. 1), respectively, and the slots 110 move along the base rivet 126 from second ends 114 (FIG. 6b) to first ends 112 (FIG. 1), respectively. This movement of the translating base guides the hinge strap and the door perpendicularly inwards with respect to the door frame 24 such that the door compresses the seal 32 evenly as shown in FIG. 1.

An advantage of mounting the hinge to the exterior surface of the structure and the exterior face of the door is that the space occupied by the hinge is minimized so that more space is available for allowing individuals to move in and out of the access opening or for storing items within the structure. For many naval and aircraft applications, where the conservation of usable space is a key design requirement, the front-mounted hinge provides a unique space saving solution. Also, because the front-mounted hinge guides the door to compress the seal evenly, a very strong seal between the door and the door frame is created. Proper sealing is important in many different applications. For example, seals utilized with aircraft need to be compressed evenly so that the associated aircraft structure can be properly pressurized during flight. On the other hand, seals utilized for ships need to compressed evenly to prevent salt water from entering the structure and damaging equipment stored within the structure. An additional advantage of the front-mounted hinge is that the cover assembly allows the hinge to provide a flush surface and a clean profile when the door is closed, while still allowing the door open to extreme open angles.

Those skilled in the art will recognize that other modifications and variations can be made in the front-mounted hinge of the present invention and in the construction and operation of the front-mounted hinge without departing from the scope or spirit of this invention. For example, it should be understood that the front-mounted hinge could al so be with a variety of different structures, whether they be other types of vehicle structures, such as an automobile, or stationary structures, such as house, where it is desirable to have strong sealing action for a door. With such possibilities in mind, the invention is defined with reference to the following claims.

I claim:

1. A front-mounted hinge for rotation of a door between open and closed positions with respect to an access opening of a structure, the hinge comprising:

a housing having interior and exterior surfaces, the housing including a mounting plate for mounting the hinge to the exterior surface of the structure;

a translating base slidably mounted to the interior surface of the housing movable between an abutting position, in which the translating base abuts the mounting plate of the housing, and an elevated position, in which the translating base is moved away from the the mounting plate of the housing; and a hinge strap pivotally connected to the translating base for mounting the hinge to the exterior face of the door, so that when the hinge strap is pivoted, the translating base is caused to move between the abutting and elevated positions and the door moves between closed and open positions.

2. The hinge of claim 1, further comprising a slot in the translating base, a guide slot in the housing, a base rivet extending though the housing and the slot in the translating base, the base rivet mounting the translating base to the interior surface of the housing, and a guide pin extending from the translating base through the guide slot in the housing.

3. The hinge of claim 2, wherein the slot and the guide slot are angled.

4. The hinge of claim 1, further comprising a cover mounted within an open top end of the housing, a shield permanently connected to the cover, a shield rivet extending through the translating base and the shield rotatably mounting the cover and the shield to the translating base, and a spring surrounding the shield rivet biasing the cover to a flush position relative to the housing.

5. The hinge of claim 1, further comprising a strap rivet extending through the translating base and the hinge strap, such that the strap rivet pivotally connects the hinge strap to the translating base and defines a pivot axis.

6. The hinge of claim 1, wherein the translating base is U-shaped.

7. A front-mounted hinge for rotation of a door between open and closed positions with respect to an access opening of a structure, the hinge comprising:

a housing having interior and exterior surfaces, the housing including a mounting plate for mounting the hinge to the exterior surface of the structure and a guide slot;

a translating base having a slot;

a base rivet extending through the housing and the slot slidably mounting the translating base to the interior surface of the housing such that the translating base is movable between an abutting position, in which the translating base abuts the mounting plate of the housing, and an elevated position, in which the translating base is moved away from the mounting plate;

a guide pin extending from the translating base through the guide slot in the housing; and a hinge strap pivotally connected to the translating base for mounting the hinge to the exterior face of the door, so that when the hinge strap is pivoted, the translating base is caused to move between the abutting and elevated positions and the door moves between closed and open positions.

8. The hinge of claim 7, wherein the slot and the guide slot are angled.

9. The hinge of claim 7, further comprising a cover mounted within an open top end of the housing, a shield permanently connected to the cover, a shield rivet extending through the translating base and the shield rotatably mounting the cover and the shield to the translating base, and a spring surrounding the shield rivet biasing the cover to a flush position relative to the housing.

10. The hinge of claim 7, further comprising a strap rivet extending through the translating base and the hinge strap, such that the strap rivet pivotally connects the hinge strap to the translating base and defines a pivot axis.

11. The hinge of claim 7, wherein the translating base is U-shaped.

12. A front-mounted hinge for rotation of a door between open and closed positions with respect to an access opening of a structure, the hinge comprising:

a housing having interior and exterior surfaces, the housing including a mounting plate for mounting the hinge to the exterior surface of the structure, an open top end, and a pair of angled guide slots;

a U-shaped translating base, the translating base including a central member with a pair of legs, each leg having an angled slot formed therethrough;

a base rivet extending through the housing and each angled slot slidably mounting the translating base to the interior surface of the housing such that the translating base is movable between an abutting position, in which the translating base abuts the mounting plate of the housing, and an elevated position, in which the translating base is moved away from the mounting plate;

a guide pin extending from each leg of the translating base through each angled guide slot, respectively;

a hinge strap pivotally connected to the translating base for mounting the hinge to the exterior face of the door, so that when the hinge strap is pivoted, the translating basis caused to move between the abutting and elevated positions and the door moves between closed and open positions;

a cover mounted within the open top end of the housing;

a shield permanently connected to the cover;

a shield rivet extending through the translating base and the shield rotatably mounting the cover and the shield to the translating base; and a spring surrounding the shield rivet biasing the cover to a flush position relative to the housing.

* * * * *